United States Patent Office 3,455,702
Patented July 15, 1969

3,455,702
HYDROFURANS AS STRAWBERRY-LIKE FLAVORINGS FOR FOODSTUFFS AND BEVERAGES
Bruno Willhalm and Alan Francis Thomas, Geneva, Switzerland, assignors to Firmenich & Cie, Geneva, Switzerland
No Drawing. Filed Dec. 27, 1965, Ser. No. 516,721
Claims priority, application Switzerland, Dec. 31, 1964, 16,889/64
Int. Cl. A23l 1/26; C07d 7/00
U.S. Cl. 99—140       7 Claims

ABSTRACT OF THE DISCLOSURE

A strawberry flavor may be imparted to foodstuffs and beverages by incorporating therein a minor proportion of a dihydrofuran with or without other flavoring ingredients.

---

The present invention relates to a new flavoring agent which is capable of imparting a fresh strawberry-like flavor and aroma to foodstuffs and beverages. The invention furthermore relates to foodstuffs and beverages containing minor proportions of the said new flavoring agent.

Strawberry flavors are used extensively for aromatizing foodstuffs and beverages such as confectionary products, ice cream, yogurt, milk drinks, syrups, carbonated beverages, etc. Two types of strawberry flavors are used in the foodstuff and beverage industry, viz, natural extracts and imitation flavors prepared from synthetic flavoring ingredients. A conventional method for preparing natural flavor extracts consists in grinding strawberries, mixing the pulp with alcohol, pressing the alcoholic pulp, distilling the pressing residue, adding the distillate to the expressed juice and concentrating the mixture. Strawberries are very sensitive fruit and their flavor and aroma begin to deteriorate immediately after they have been picked. The deterioration of the flavor and aroma is the result of fermentative reactions which proceed at a high velocity, and of losses of flavor constituents during concentration. It is therefore very difficult to preserve the freshness and characteristic flavor notes in natural strawberry flavor extracts. Many of the commercially available natural flavor extracts have a flavor and aroma which are flattened out and lack freshness. A further disadvantage of natural flavor extracts resides in the fact that they have a relatively low flavoring strength and must, therefore, be used in relatively high proportions in order to obtain the desired flavoring effects in foodstuffs and beverages. Furthermore, the natural strawberry flavor extracts cannot be used in foodstuffs which, during their processing, are subjected to a high temperature treatment, for instance in the manufacture of baked goods and hard candy. In order to overcome the disadvantages inherent in natural strawberry flavor extracts, efforts have been made to provide imitation flavors by using synthetic products having uniformly reproducible flavoring characteristics. As can easily be understood, it is very difficult if not impossible to match exactly the natural flavor of fresh strawberries. The commercially available imitation strawberry flavors lack some of the characteristic notes of natural strawberry flavor and aroma.

It is an object of this invention to provide a new flavoring agent which is capable of imparting a strawberry-like flavor and aroma to foodstuffs and beverages.

A further object of this invention is to provide a flavoring agent which can be added to natural strawberry flavor extracts and imitation strawberry flavors in order to improve or enhance the flavoring properties thereof and make more natural their flavor and aroma.

Another object of this invention is to provide foodstuffs and beverages having a fresh strawberry-like flavor and aroma.

Still another object of this invention is to provide a method for imparting a fresh strawberry-like flavor and aroma to foodstuffs and beverages.

We have found that 2,5-dimethyl-3-hydroxy-4-oxo-4,5-dihydrofuran, which is a known compound (cf. J. E. Hodge and B. E. Fisher, "The Structure of a Pseudoreductone from 1-Rhamnose, 145, ACS Meeting, September 1963, Abstracts 3–D), possesses the property of developing a powerful strawberry-like flavor and aroma in foodstuffs and beverages in which the said furan derivative has been incorporated in minute proportions. This finding was quite unexpected since 2,5-dimethyl-3-hydroxy-4-oxo-4,5-dihydrofuran in its solid pure (undiluted) form has but a faint uncharacteristic odor. Although this compound was known, its specific property of being able to develop a characteristic strawberry-like flavor and aroma at extremely low concentrations in foodstuffs and beverages had not been discovered or recognized prior to the present invention. Furthermore, we have found that certain functional derivatives of 2,5-dimethyl-3-hydroxy-4-oxo-4,5-dihydrofuran, in particular the derivatives in which the hydroxy group is etherified with lower alkyl, such as methyl or ethyl, possess the same property of developing a strawberry-like flavor at low concentrations in foodstuffs and beverages. The flavoring properties of the derivatives are somewhat less powerful than those of the parent compound. Instead of 2,5-dimethfl-3-hydroxy-4-oxo-4,5-dihydrofuran there can also be used precursors which are capable of forming 2,5-dimethyl-3-hydroxy-4-oxo-4,5-dihydrofuran in the foodstuffs or beverages as a result of an interaction between the precursors with components of the foodstuffs or beverages.

The flavoring agent of this invention comprises at least one compound of the formula

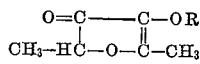

I wherein R represents hydrogen or a lower alkyl group containing from 1 to 2 carbon atoms, or a precursor capable of being converted into the compound of Formula I wherein R is hydrogen. Precursors which can be used include from instance the lower fatty acid esters of 2,5 - dimethyl - 3 - hydroxy-4-oxo - 4,5-dihydrofuran, such as the formate or acetate. These precursors are readily saponified to the free hydroxyfuran derivative.

2,5 - dimethyl - 3 - hydroxy-4-oxo - 4,5 - dihydrofuran, which is covered by the above Formula I, can be prepared for instance as follows:

A mixture of 100 g. of rhamnose monohydrate, 28.4 g. of piperidine and 43.7 g. of acetic acid is heated for 24 hours in 100 ml. of absolute ethanol at 70° C. The reaction mixture is then extracted with ether. The extract is dried over MgSO₄ and concentrated to obtain 84 g. of a crude product. The latter is distilled and 43 g. of a fraction distilling at 70–73° C./0.005 mm. Hg are collected. The crystallized product is twice recrystallized from ether. There are thus obtained white crystals of 2,5 - dimethyl - 3 - hydroxy - 4 - oxo - 4,5 - dihydrofuran melting at 82–83° C.

The methyl ether of this compound can be obtained as follows:

A solution of 5 g. of 2,5-dimethyl-3-hydroxy-4-oxo-4,5-dihydrofuran in 10 ml. of methanol is treated with an excess of ethereal diazomethane. The reaction takes place immediately. After an hour the reaction mixture is concentrated under reduced pressure, and the residue is distilled. There are thus obtained 3.1 g. of the methyl ether boiling at 42° C./0.4 mm. Hg.

The acetate of 2,5-dimethyl-3-hydroxy-4-oxo-4,5-dihydrofuran can be prepared as follows:

0.25 g. of 2,5-dimethyl-3-hydroxy-4-oxo-4,5-dihydrofuran is dissolved in 5 ml. of absolute pyridine and 0.3 ml. of acetic acid anhydride. The reaction mixture is allowed to stand for 24 hours at 0° C. and then concentrated under reduced pressure at 50° C. On distillation of the residue there is obtained 0.28 g. of the acetate boiling at 70° C./0.1 mm. Hg.

The expression "foodstuff" as used in the present application and in the claims comprises all edible goods which are normally provided with a fruit flavor, especially with a strawberry flavor.

The proportions of the flavoring agent of this invention required for obtaining the desired flavoring effects in foodstuffs and beverages are very low and will vary within certain limits according to the type and nature of the foodstuff or beverage to be flavored. 2,5-dimethyl-3-hydroxy-4-oxo-4,5-dihydrofuran, for instance, can be used in proportions of 0.5 to 50 parts (by weight) per million parts of foodstuff or beverage. In many cases good results will be achieved within the range of 1 to 20 p.p.m.

The incorporation of the flavoring agent according to this invention can be carried out at any appropriate stage in the manufacture, preparation or processing of foodstuffs and beverages and by means of conventional methods known to those skilled in the art. In order to obtain a uniform distribution of the flavor in the foodstuffs, it is advisable to use the flavoring agent in diluted form, e.g. as a solution in a nontoxic consumable solvent or diluent, such as alcohol, triacetin, propylene glycol, or other diluents known to be used in the foodstuff industry.

Foodstuffs and beverages which can be flavored with the flavoring agent of this invention, include, for instance, ice cream; confectionery goods, such as boiled sweets, hard candy, chocolate fillings, fondants, jellies and the like; custards; yogurt; milk drinks; syrups; carbonated beverages; spirits; liqueurs and the like. This list is of course not exhaustive.

The flavoring agent of this invention can also be used for flavoring pharmaceutical preparations or compositions in order to improve the taste or mask the unpleasant taste thereof.

In addition to a compound of Formula I, the flavoring agent of this invention can comprise α-methylbutyric acid and, if desired, a lower alkyl ester of this acid, e.g., the methyl or ethyl ester. Thus, e.g., a good fresh strawberry-like flavor and aroma having a natural note can be produced in foodstuffs and beverages by using a flavoring composition including 2,5 - dimethyl - 3 - hydroxy-4-oxo-4,5-dihydrofuran, α - methylbutyric acid and methyl α-methylbutyrate in the approximate proportions of 25 to 20 to 30 parts by weight.

In order to match as closely as possible the complete fresh natural flavor and aroma of strawberries, it is advantageous to include in the flavoring agent of this invention, in addition to a compound of Formula I, one or more members of at least one of the following classes of compounds:

(a) Lower aliphatic acids, e.g., those containing up to 6 carbon atoms, such as butyric acid, diethylacetic acid, α-methylbutyric acid, n-valerianic acid, isovalerianic acid, isobutyric acid, caproic acid, and the like;
(b) Lower alkyl esters of the acids of class (a), e.g., esters of alkanols containing up to 6 carbon atoms, such as the methyl, ethyl, n-propyl, isopropyl, n-butyl, isobutyl and the like esters;
(c) Lower alkyl esters of cinnamic acid, e.g., esters with alkanols containing up to 6 carbon atoms, such as the methyl, ethyl, n-propyl, isopropyl, n-butyl, isobutyl and the like esters of cinnamic acid;
(d) Lactones of aliphatic γ- and δ-hydroxycarboxylic acids, e.g., those containing from 8 to 12 carbon atoms; and
(e) Saturated or unsaturated aliphatic aldehydes, such as hexanal, 2-hexanal, 3-hexanal, and the like.

Other flavoring ingredients known to be used in the manufacture of fruit flavors, e.g., maltol, can also be included in the flavoring agent of this invention.

The invention will further be illustrated by the following examples without being limited thereto.

EXAMPLE 1

Ice cream was prepared from 1 liter of milk, 5 egg yolks and 250 g. of sugar in the following manner. The milk was heated. The sugar was mixed with the egg yolks and the heated milk added, while stirring until the mass was smooth. The mass was mildly heated and stirred until it thickened. The mass was then poured through a sieve and cooled. After the addition of the flavor the mass was frozen and processed in a conventional manner.

The flavor used as a 0.5% solution of 2,5-dimethyl-3-hydroxy-4-oxo-4,5-dihydrofuran in triacetin. This solution was used in a proportion of 200 g. per 100 kg. of ice cream mass.

The finished ice cream was tested by a panel of several persons who had to determine the type of flavor in the ice cream. All members of the panel declared without any hesitation that the ice cream had a strong strawberry flavor and aroma.

The following examples relate to flavoring agents of this invention which, in addition to 2,5-dimethyl-3-hydroxy-4-oxo-4,5-dihydrofuran, contain further flavoring ingredients. With these flavoring agents it is possible to confer to foodstuffs and beverages a flavor which is even closer to the natural flavor of strawberries.

TABLE

| | Examples | | | |
|---|---|---|---|---|
| | 2 | 3 | 4 | 5 |
| 2,5-dimethyl-3-hydroxy-4-oxo-4,5-dihydrofuran | 25 | 50 | 25 | 100 |
| Caproic acid | 40 | 40 | | |
| Ethylbutyrate | 50 | 50 | | |
| α-Methylbutyric acid | | | 20 | 20 |
| Ethyl α-methylbutyrate | | | 30 | 30 |
| Triacetin | 885 | 860 | 925 | 850 |
| | 1,000 | 1,000 | 1,000 | 1,000 |

The figures in the columns of this table represent parts by weight.

EXAMPLE 6

An imitation strawberry flavor was prepared according to the formula published by J. Merory in "Food Flavorings," page 187, The AVI Publishing Company, Inc., Westport, Conn. The imitation flavor had the following composition:

| | G |
|---|---|
| Ethyl heptoate | 0.80 |
| Oil of sweet birch | 0.80 |
| Undecalactone | 2.10 |
| Cinnamyl isobutyrate | 2.40 |
| Ethyl vanillin | 2.60 |
| Maltol | 3.00 |
| Cinnamyl isovalerianate | 3.20 |
| Dipropyl ketone | 3.40 |
| Methyl amyl ketone | 5.00 |
| Diacetyl | 6.00 |
| Ethyl valerianate | 21.20 |
| Ethyl methylphenylglycidate | 23.15 |
| Ethyl lactate | 43.20 |
| Alcohol, 95° | 100.00 |
| Propylene glycol | 783.15 |
| | 1000.00 |

The composition was diluted with propylene glycol as follows.

| Flavoring agent A: | Parts by wt. |
|---|---|
| Imitation flavor (Merory) | 100 |
| Propylene glycol | 900 |
| | 1000 |

A second flavoring agent B was prepared by adding a small quantity of 2,5-dimethyl-3-hydroxy-4-oxo-4,5-dihydrofuran to a portion of the imitation flavor according to Merory as shown below.

| Flavoring agent B: | Parts by wt. |
|---|---|
| Imitation flavor (Merory) | 100 |
| Dihydrofuran derivative | 4 |
| Propylene glycol | 896 |
| | 1000 |

One portion of an ice cream prepared as described in Example 1 was flavored with flavoring agent A (ice cream I), and a second portion of the same ice cream mass was flavored with flavoring agent B (ice cream II). Samples of ice creams I and II were tested by a panel consisting of 34 test persons. The test persons had to answer two questions:

(1) What was the type of fruit flavor in ice creams I and II?

(2) Which of the two types of ice creams I and II did they prefer?

52 out of the 34 test persons recognized without any hesitation the strawberry flavor. 28 out of the 34 test persons preferred the ice cream of type II and declared that this ice cream had a much more balanced and rounded flavor and aroma. The flavor was furthermore described as much more natural and fresh strawberry-like than the flavor of ice cream I.

We claim:

1. A method for imparting a strawberry-like flavor and aroma to a foodstuff or beverage which comprises incorporating therein, as flavoring agent, from 0.5 to 50 parts by weight per million parts thereof of at least one compound of the formula

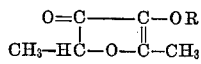

wherein R represent hydrogen or an alkyl group having from 1 to 2 carbon atoms.

2. A method according to claim 1 wherein R is hydrogen.

3. A method according to claim 1 wherein R is alkyl.

4. A method according to claim 1 wherein the amount of flavoring agent is from 1 to 20 parts per million.

5. A process according to claim 1 wherein the flavoring agent additionally comprises α-methylbutyric acid in an amount of from 0.4 to 40 parts by weight per million parts of the foodstuff or beverage.

6. A process according to claim 5 wherein the flavoring agent additionally comprises a lower alkyl ester of α-methylbutyric acid in an amount of from 0.6 to 60 parts by weight per million parts of said foodstuff or beverage.

7. A composition comprising (a) footstuff or beverage and (b) flavoring agent, the flavoring agent comprising from 0.5 to 50 parts by weight per million parts of the composition of at least one compound of the formula

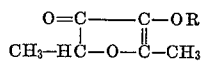

wherein R represents hydrogen or an alkyl group having from 1 to 2 carbon atoms.

References Cited

UNITED STATES PATENTS 2,936,308  5/1960  Hodge _____ 260—211

FOREIGN PATENTS 6,517,153  6/1966  Netherlands.

OTHER REFERENCES

Hodge et al.: The structure of a Pseudoreductone from 1 Rhamnose, 145, ACS Meeting, September 1963, Abstracts 3-D.

Jacobs: Synthetic Food Adjuncts, D. Van Nostrand Company, Inc., New York, 1947, p. 165.

McFadden et al.: "Volatiles From Strawberries," J. of Chromatography, vol. 18, 1965 pp. 10–14.

Willhalm et al.: Helvetica Chimica Acta, vol. 49, 1966, pp. 65–67.

RAYMOND N. JONES, Primary Examiner

H. H. KLARE III, Assistant Examiner

U.S. Cl. X.R.

99—28, 136; 260—347.8